United States Patent
Robinson et al.

(10) Patent No.: US 11,368,994 B1
(45) Date of Patent: Jun. 21, 2022

(54) PROCESS FOR MANAGING RECONNECTIONS OF DEVICES IN A NETWORK

(71) Applicant: Amazon Technologies, Inc., Seattle, WA (US)

(72) Inventors: Quentin N. Robinson, Seattle, WA (US); Rashmesh Radhakrishnan, Snohomish, WA (US); Abraham Martin Passaglia, Seattle, WA (US); Andrew Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

(21) Appl. No.: 16/806,908

(22) Filed: Mar. 2, 2020

(51) Int. Cl.
| | |
|---|---|
| *H04W 4/00* | (2018.01) |
| *H04W 76/18* | (2018.01) |
| *H04W 76/19* | (2018.01) |
| *H04W 12/08* | (2021.01) |
| *H04W 76/15* | (2018.01) |
| *H04W 12/06* | (2021.01) |
| *H04W 84/12* | (2009.01) |

(52) U.S. Cl.
CPC ......... *H04W 76/18* (2018.02); *H04W 12/068* (2021.01); *H04W 12/08* (2013.01); *H04W 76/15* (2018.02); *H04W 76/19* (2018.02); *H04W 84/12* (2013.01)

(58) Field of Classification Search
CPC ..... H04W 76/15; H04W 76/18; H04W 76/19; H04W 12/068; H04W 12/08
USPC ........................................................ 370/338
See application file for complete search history.

(56) References Cited

U.S. PATENT DOCUMENTS

| | | | | |
|---|---|---|---|---|
| 9,094,407 | B1 * | 7/2015 | Matthieu | H04L 63/102 |
| 9,270,660 | B2 * | 2/2016 | Smith | H04L 63/08 |
| 2017/0118210 | A1 * | 4/2017 | Athias | H04L 63/0876 |
| 2018/0115892 | A1 * | 4/2018 | Kotay | H04W 12/04 |
| 2018/0288060 | A1 * | 10/2018 | Jackson | H04L 63/102 |
| 2019/0182666 | A1 * | 6/2019 | Kotay | H04W 12/08 |
| 2019/0239074 | A1 * | 8/2019 | Bryksa | H04W 12/084 |

* cited by examiner

*Primary Examiner* — Temica M Beamer
(74) *Attorney, Agent, or Firm* — Kilpatrick Townsend & Stockton LLP

(57) ABSTRACT

Techniques for a server-based reconnection of disconnected devices in a network are described. In an example, a computer system receives, from a second device, first data of a first device. The first data indicates that the first device has disconnected from the network due a change in the password of the network. The computer system determines that the first device is authorized to connect to the network. Based on the first device being authorized, the computer system transmits a request for a token. The computer system compares the token to a token stored by the computer system. In response to the tokens matching, the computer system transmits second data to the first device via the second device. The second data includes an updated password of the network. The first device uses the second data to reestablish a connection with the network.

20 Claims, 9 Drawing Sheets

```
┌─────────────────────────────────────────────────────────────────────┐
│ Generating, by a first device, an association with a user account   │
│ associated with a local area network 704                            │
└─────────────────────────────────────────────────────────────────────┘

┌─────────────────────────────────────────────────────────────────────┐
│ Detecting, by the first device, a connection failure of a connection│
│ with a local area network 708                                       │
└─────────────────────────────────────────────────────────────────────┘
                                    │
                                    ▼
┌─────────────────────────────────────────────────────────────────────┐
│           Determining a cause of the connection failure 712         │
└─────────────────────────────────────────────────────────────────────┘
                                    │
                                    ▼
┌─────────────────────────────────────────────────────────────────────┐
│ Broadcasting a beacon message that includes an indication of the    │
│ connection failure and the cause of the connection failure, the     │
│ beacon message being received by a second device 716                │
└─────────────────────────────────────────────────────────────────────┘
                                    │
                                    ▼
┌─────────────────────────────────────────────────────────────────────┐
│         Establishing a secure connection with the second device 720 │
└─────────────────────────────────────────────────────────────────────┘
                                    │
                                    ▼
┌─────────────────────────────────────────────────────────────────────┐
│ Transmitting token to the second device to authenticate the first   │
│ device, the token being configured to be compared to a second token │
│ stored remotely 724                                                 │
└─────────────────────────────────────────────────────────────────────┘
                                    │
                                    ▼
┌─────────────────────────────────────────────────────────────────────┐
│ Receiving, from the second device, first instructions configured to │
│ provision the first device 728                                      │
└─────────────────────────────────────────────────────────────────────┘
                                    │
                                    ▼
┌─────────────────────────────────────────────────────────────────────┐
│ Reestablishing the connection with the local area network using the │
│ first instructions 732                                              │
└─────────────────────────────────────────────────────────────────────┘
```

FIG. 7

Receiving a beacon message from a first device, the beacon message including an indication of a connection failure of a connection between the first device and a local area network and a cause of the connection failure 804

↓

Transmitting, to a computer system, first data that includes the beacon message 808

↓

Receiving, from the computer system, first instructions to establish a secure connection with the first device 812

↓

Receiving, from the first device, a token 816

↓

Transmitting, to the cloud server, the token 820

↓

Receiving, from the computer system, second instructions to provision the first device 824

↓

Provisioning the first device such that the first device is configured to reestablish the connection with the local area network 828

FIG. 8

PROCESS FOR MANAGING RECONNECTIONS OF DEVICES IN A NETWORK

BACKGROUND

Most computing devices, such as consumer electronics, support wireless connectivity. Typically, a computing device connects to a wireless access point that provides access to a data network. In many cases, functionalities of the device through the data network become available only after the device is registered with a user account. Typically, the registration process involves many user input steps to identify the device and the user account.

BRIEF DESCRIPTION OF THE DRAWINGS

Various embodiments in accordance with the present disclosure will be described with reference to the drawings, in which:

FIG. 7 illustrates an example process for managing reconnection of disconnected devices of a network using a provisioner device, according to an embodiment of the present disclosure;

FIG. 8 illustrates an example of a process for reestablishing a connection in disconnected device of a network, according to an embodiment of the present disclosure.

DETAILED DESCRIPTION

Figure 1:
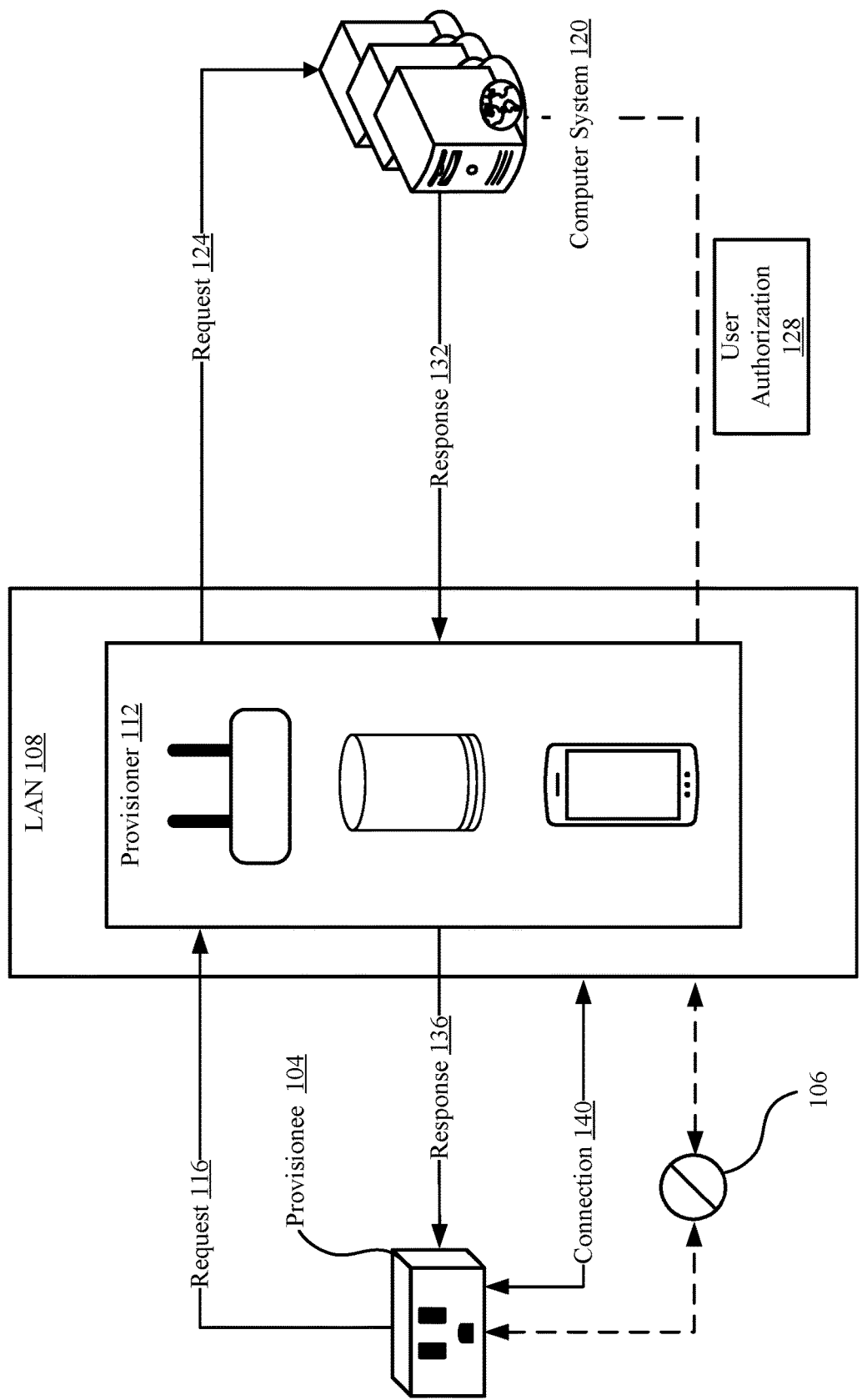
FIG. 1 illustrates an example of a computing environment for server-based reconnection of a disconnected device in a local area network, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a server-based management of a process to reconnect devices to a network. For instance, a server can cause a device that has been disconnected from a network to be provisioned such that the device can, automatically and without user input unless necessary, reestablish a connection with the network. In the interest of clarity, such a device is referred to herein as a provisionee (e.g., a device that was connected to a network, lost the connect to the network, and is in the process of reconnecting to the same network or a different network). For instance, a provisionee broadcasts a first message to devices within broadcast range, where the first message indicates that a connection failure has caused the provisionee to be disconnected from a network. The message is received by a provisioner (e.g., one of the devices that receives the first message) which transmits a second message to the remote computer system reporting the connection failure. The remote computer system determines if the provisionee is authorized to connect to the network by, for example, determining that the provisionee is associated with a user account that is also associated with the local area network. The remote computer system then transmits data to the provisioner that causes the provisioner to provision the provisionee (e.g., provide sufficient data and/or executable instructions to the provisionee to cause the provisionee to reconnect to the network). The provisionee can then reestablishes a connection with the local area network.

In an illustrative example, a first internet of things (IoT) device is connected to a local area network that includes a second IoT device. The first IoT device and the second IoT device are registered under a same user account. The user account stores credentials network (e.g., a network identifier such as a service set identifier and/or a password) for the local area and a token for reconnecting the first IoT device. When a credential of an access point of the local area network is changed and to which the first IoT device was previously connected, the first IoT device is disconnected from the network. The first IoT device broadcasts a Bluetooth beacon indicating that a connection failure that caused the first IoT device to disconnect from the access point. The second IoT receives the Bluetooth beacon and (assuming it is still connected to the local area network) sends a message to the server indicating the loss of the connection. The server determines that the first IoT device is registered under the user account associated with the LAN and instructs the second IoT to establish a secure connection with the first IoT device. The second IoT device receives the token from the first IoT device over the secure connection and transmits the token to the server. The server compares the token to a token stored under the user account and upon a match, determines that the first IoT device is authorized to reconnect to the LAN. The server determines a second credential from stored credentials under the user account for the reconnection via the access point and instructs the second IoT device to transmit the second credential to the first IoT device. The first IoT device can reconnect to the local area network via the access point by using the second credential.

In the interest of clarity of explanation, embodiments of the present disclosure are described in connection with Wi-Fi and Bluetooth protocols. However, the embodiments of the present disclosure are not limited as such and similarly apply to other types of wireless communications protocol. For instance, the embodiments similarly apply to using Zigbee, Z-Wave, and/or any wireless communications protocol usable in a wireless local area network (WLAN), wireless persona area network (WPAN), and/or a mesh network.

FIG. 1 illustrates an example of a computing environment for server-based reconnection of a disconnected device in a local area network, according to an embodiment of the present disclosure. As illustrated in FIG. 1, a provisionee 104, which is an example of a first device uses a primary network interface (e.g., a wireless interface such as Wi-Fi, Bluetooth, Zigbee, or the like, or a wired interface) to connect to an access point of a local area network (LAN) 108. In FIG. 1, the provisionee 104 is illustrated as a smart plug. Of course, the embodiments of the present disclosure similarly apply to any other type of user devices including IoT devices, such as a smart speaker, a smart appliance, a smart control system (e.g., a thermostat), a smart set top box, a smart television, a smart sensor, and the like. A computer system 120 registers the provisionee 104 by generating an association between the provisionee 104 and a user account (the user account may also be associated with the local area network 108). Registration may occur at any time such as the first time the provisionee 104 is powered on or connected to a home network, or upon a local determination that no registration has been performed yet, or some other event. Upon registration, the computer system 120 transmits a token to the provisionee 104. The token is stored by the provisionee 104 as a first token and stored by the computer system 120 as a second token. The token may be used to verify that the provisionee 104 is authorized to reconnect to the LAN 108.

Other authorization techniques may be employed in addition to or in place of tokens. For instance, an asymmetric cryptographic protocol such as a public-key cryptography. The computer system 120 may store the private key and distribute the corresponding public key to the devices of the local area network 108 and the provisionee 104 during registration. In another instance, a zero knowledge proof may be used in which the provisionee 104 may be authorized by the computer system 120 without transmitting the token to the computer system 120.

During operation of the provisionee 104, various events may occur that can cause a connection failure 106 in the primary network interface of the provisionee 104, where any of the events can cause the provisionee 104 to disconnect from an access point of the local area network 108. For instance, the service set identifier or credential may change for an access point of the local area network 108 and to which the provisionee 104 was connected, thereby causing provisionee 104 to be disconnected from the local area network 108. The provisionee 104 may first attempt to reconnect to the local area network 108 using the service set identifier and credential stored by the provisionee 104 (e.g., the service set identifier and credential previously used to connect to the network). If a connection is reestablished (e.g., connection 140), then the provisionee 104 may continue to operate. Otherwise, the provisionee 104 can continually attempt to reconnect while performing the remedial action described in FIG. 1 to reconnect to the local area network 108. If the provisionee 104 is able to reconnect at any time during the remedial action, then the provisionee 104 can transmit a communication to the computer system 120 to terminate the remainder of the remedial action.

If the provisionee 104 is unable to reestablish a connection with the local area network 108, the provisionee 104 performs the remedial action to reestablish a connection with the local area network 108. In an example, the provisionee 104 may first determine a cause of the connection failure. For instance, if the credential of the access point has changed, the access point may provide an error message that indicates that the connection is rejected due to an incorrect credential. The provisionee 104 may record the error message for use in reestablishing a connection with the network. The provisionee 104 may determine if the access point supports a hidden network. For instance, access points can support the hidden network (with a preset service set identifier and without a credential—e.g., such a network is an open network) with limited access that can be used to provision new devices or reconnect provisionee. In some instances, the hidden network may provide limited or no accessibility with other devices of the local area network 108 or remote networks (e.g., the Internet). If the access point supports a hidden network, then the provisionee 104 connects to the hidden network and the access point becomes the provisioner 112.

If the access point does not a hidden network, the provisionee 104 may use a secondary network interface (e.g., a wireless interface such as Wi-Fi, Bluetooth, Zigbee, or the like, or a wired interface) to transmit a request 116 to a provisioner 112. The request, in an example, can be a message that follows the format of the network interface (e.g., Bluetooth beacon message for a Bluetooth network interface, etc.). For instance, the secondary network interface can be a Bluetooth radio that transmits a beacon message to nearby devices (including the provisioner 112). The provisioner 112 can be a device that is associated with a same user account as the provisionee 104. The request 116 includes first data that comprises an indication of the connection failure of the connection between the provisionee 104 and the access point of the local area network 108 and, as applicable, the cause of the connection failure.

The provisioner 112 can be any type of a device that is on a home network and that has a data connection to a computer system 120. For instance, the provisioner 120 can be an access point, a smart speaker, a mobile phone, a personal computer, or any other user device. The provisioner 112 sends a request 124 to the computer system 120. The request 124 can correspond to the request 116 (e.g., include the same information) and like the request 124 may be formatted according to the network interface used for its transmission to computer system 120 (e.g., Wi-Fi, Ethernet, etc.). Sending the first data can include forwarding the beacon, or as applicable, repackaging the information in the beacon into another format suitable for the data connection between the provisioner 108 and the computer system 120.

In response, the computer system 120 validates the request 124 (e.g., determines that the provisionee 104 is authorized to reconnect to the local area network 108) by relying on second data stored by the computer system 120 about the provisionee 104, the LAN 108, the provisioner 112, other devices connected to the LAN 108, and/or the user account. The second data can include information about device types available from a manufacturer, correct device identifiers of the manufacturer, activity on the local area network (e.g., from other devices), known software or hardware bugs associated with the provisionee 104 or similar device type, and the like. The information in the request 124 and the second data may be used to determine whether the provisionee 104 is authorized to reconnect to the local area network 108.

In some instances, even if the request 124 is validated based on the second data, other factors can be used to determine that the provisionee 104 is authorized to reconnect to the network. For example, if the provisionee 104 supports video capability and/or one-way or two-ways communications, the computer system 120 may confirm this authorization by requesting explicit user input. In particular, the computer system 120 can determine a user device, such as a mobile device, from the user account, and send a request to this user device to present a user interface requesting the user confirmation. Upon receiving user input at the user interface confirming the authorization, the user device sends this user input to the computer system 120 and the computer system 120 proceeds forward with the reconnection process. Examples, of user input can include, but is not limited to credentials (e.g., username and password), a pin (e.g., an alphanumeric code), a single-use identification code, answer to a security question, a universally unique identifier (UUID) of provisionee 104, or the like.

Once validated, the computer system 120 may transmit a first instruction to the provisioner 112 to cause the provisioner 112 to establish a secure connection with the provisionee 104. The secure connection is a peer-to-peer connection that can use the same network interface used to broadcast the initial indication of the connection failure (e.g., Bluetooth when the broadcast message is transmitted via Bluetooth beacon) or any predetermined network interface (e.g., Wi-Fi, Zigbee, or the like).

Upon receiving the first instructions, the provisioner 112 transmits a secure connection request to provisionee 104. The provisionee 104 may determine that the provisioner 112 and/or the computer system 120 are authorized devices such that it is safe to establish the secure connection. The provisioner 112 may use tokens, public-key cryptography, a zero knowledge proof, or the like to determine whether the provisioner 112 and/or the computer system 120 are authorized devices to establish a secure connection with. Once, the provisionee 104 determines the connection request is from an authorized device, the provisionee 104 finishes the process of establishing the secure connection with the provisioner 112. The provisionee 104 may wait until the secure connection is established before transferring some data (such as data associated with the cause of the connection failure).

In some instances, the provisionee 104 can to transfer different forms of data over the secure connection than over the broadcast beacon. In one example, the computer system 108 may request the first token stored by provisionee 104 via the secure connection with the provisioner 112. If the first token matches the second token stored by computer system 120, the provisionee 104 can be validated as being authorized to connect to the network. When a device is deregistered with the user account, registered to a new user account, reset to factory settings, etc. the tokens may be erased thus preventing comparison of the first token to the second token. This can prevent device that has been transferred to a new user account from gaining unauthorized access to the network.

In another example, such as when the provisionee 104 provides only the indication of the connection failure (and does not transmit information about the cause of the connection failure) the computer system 120 can perform an interrogation by sending a request to the provisionee via the secure link with the provisioner 112 for additional information about the provisionee 120, the cause of the connection failure, or the networks in range of provisionee 104. If the provisionee 104 was offline for a time interval exceeding a threshold time interval before reporting the connection failure (determined by the computer system by accessing a data record of the user account or as indicated by the provisionee 104), then the computer system 120 may perform an interrogation to ensure provisionee 104 is still being operated by a user associated with the user account. For instance, the computer system may request from the provisionee 104 over the secure connection with the provisioner 112, a list of networks within a communication range (e.g., radio frequency range or the like) of the provisionee 104. The computer device 120 can compare the list to a list stored in the user account (e.g., previously received from provisionee 104, provisioner 112, another device of the network, or compiled from one or more devices of the network) as a factor in determining whether provisionee 104 is authorized to access the network. If the lists match then provisionee 104 is physically located in a same or near the same location as it was before the provisionee 104 disconnected (meaning it is likely to be authorized to access the network). If the lists do not match, the provisionee is located in different location, which may indicate that provisionee 104 is being operated to gain unauthorized access to the network.

In one example, since provisionee 104 is continually attempting to reconnect to the network. The computer system 120 may receive a message from a provisionee 104 indicating that one such reconnection attempt was successful. The computer system 120 may confirm that the provisionee 104 has reconnected to the local area network 108 by determining that the message was received over the local area network (e.g., via Internet Protocol analysis or the like). The computer system 120 may then terminate further remedial operations.

If no reconnection is received and once provisionee 104 is validated, the computer system 120 sends response 132 that includes second instructions to the provisioner 112. The second instructions can include data that enables the provisionee 104 to reconnect to the LAN 108. In one example, the computer system 120 stores a password locker associated with the user account, in this example, the computer system 120 retrieves the current service set identifier and password for the local area network 108 from the password locker for transmission to the provisioner 112 which, in turn, transmits this data via a response 136 to the provisionee 104. In another example, no password locker is stored or used. Instead, the second instructions may direct the provisioner 112 to transmit the service set identifier and password stored by provisioner 112 to the provisionee 104 via the response 136.

The second instructions may be based on a cause of the connection failure as determined be the provisionee 104 and/or the computer system 120. For instance, if the password of the network has been changed, the provisionee can receive an error message when connecting to the network 108 that indicates the password is supplied by the provisionee 104 is incorrect. The provisionee 104 can include the cause of the connection failure in request 116 or upon being interrogated by the computer system 120. Some causes may be determined by the provisionee 104 such as changes in service set identifier, a change in password, network topology (e.g., poor signal quality, interference, etc.), or the like. Some causes may be determined by the computer system 120 such as known software bug in the software or hardware of the provisionee 104 (e.g., by a lookup of the serial number of UUID of the provisionee 104), the network topology (e.g., reported by the provisionee 104, provisioner 112, or other devices of the network 108), or the like.

The second instructions can include instructions, data, and/or software that address the cause of the connection failure to enable the provisionee 104 to reestablish a connection with the local area network 108. The second instructions can include, but are not limited to, a service set identifier and password, a password of the service set identifier, software update, instructions to retrieve a software update, an identification of a new frequency band, identification of a proxy device (and credentials to enable a connection to the proxy), and/or the like. In one example, the provisionee determines the cause of the connection failures. For instance, the cause of the connection failure can be a change in credential of the network 108 (e.g., service set identifier and/or password). The computer system 120 determines that the provisionee 104 is authorized to connect to the network 108 and transmits an identification of the service set identifier of the network and the password (e.g., a new service set identifier if the service set identifier was changed and/or a new password if the password was changed).

In another example, the provisionee 104 does not report the cause of the connection failure (or reports that the cause of the connection failure is unknown). The computer system 120 can receive first information from the provisionee (e.g., a device type, version information, serial number or UUID, and/or the like) through request 116 or through the interrogation. The computer system 120 can compare the first information with second information (e.g., current version information, known software or hardware bugs, network topology, and/or the like) that is stored or obtained by the computer system to determine the cause of the connection failure. The computer system 120 can generate the second instructions based on the cause of the connection failure determined by computer system 120. For instance, if the cause is a known bug or a version mismatch between the version of software executing on the provisionee 104 and a more recent version of the software, the second instructions can include a software update (or instructions for obtaining the software update from a different computer system). Once the instructions are received by the provisionee 1043, the provisionee 104 updates its software and then reestablishes a connection with the local area network 108. If a connection still cannot be established, provisionee 104 and/or computer system 120 can identify a different cause of the connection failure. In that instance, the second instructions can include an instructions that would correct the identified cause of the connection failure.

In yet another example, the provisionee 104 and the computer system 120 both determine a cause of the connection failure. The provisionee 104 transmits a first cause of the connection failure to the computer system 120 (via provisioner 112). The computer system 120 determines a second cause of the connection failure using information received from the provisionee 104 (except for the first cause of the connection failure), provisioner 112, and information stored by computer system 120. The computer system 120 determines if the first cause of the connection failure matches the second cause of the connection failure. If first cause matches the second cause, then the provisionee 104 is authorized to connect and the computer system 120 transmits second instructions that address the cause of the connection failure.

The provisionee 104 uses the data to reestablish a connection 140 with the local area network 108. Reestablishing a connection with local area network can include connect to a same access point (as prior to the connection failure), to a different access point, to a proxy device that is connected to the local area network 108, to a different network, using a different frequency band, or the like. Once the connection is reestablished computer system 120 may generate a new token that replaces the first token stored by provisionee 104 for future verification of the device in case of subsequent connection failure.

Figure 2:
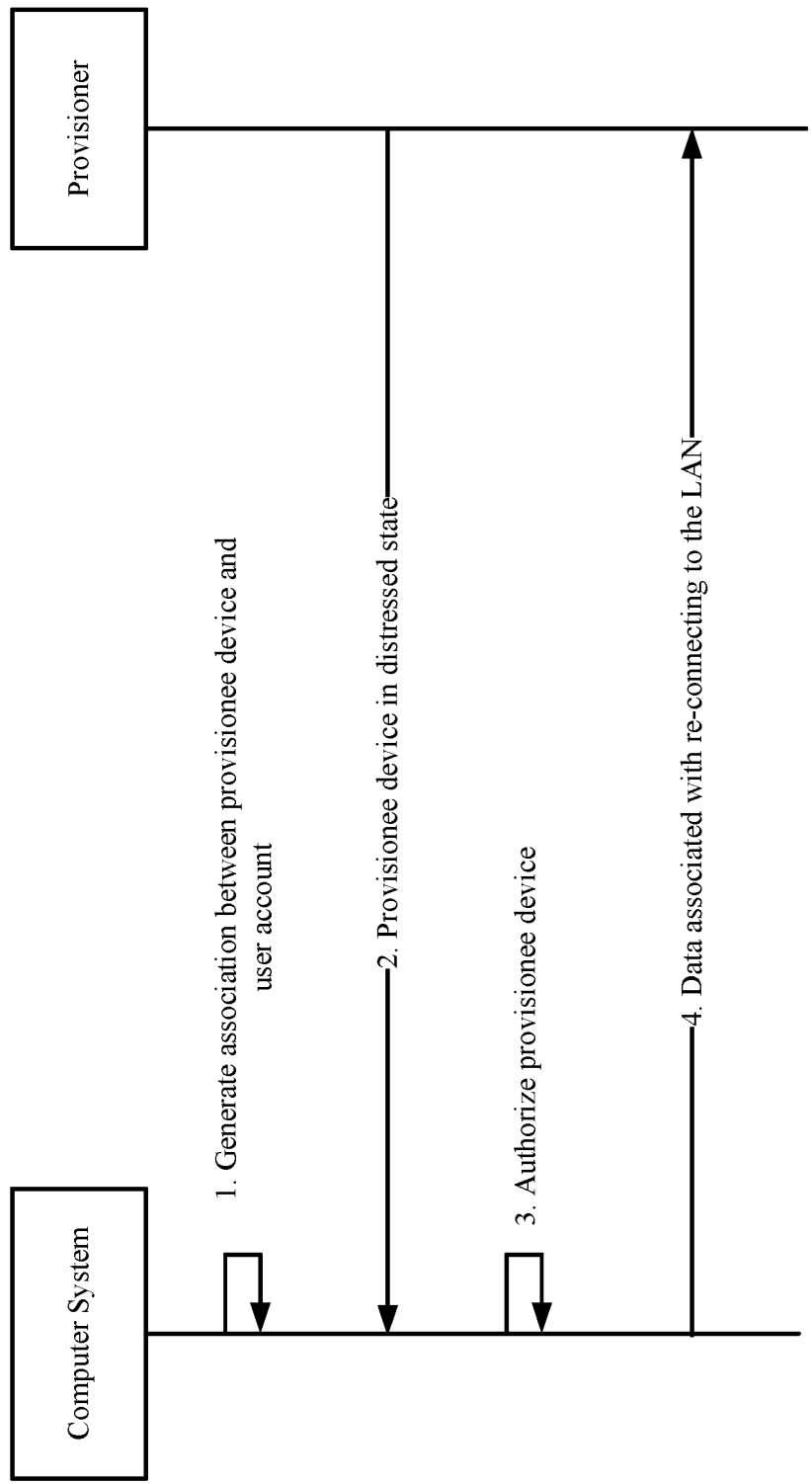
FIG. 2 illustrates an example of a diagram for server-based reconnection of a disconnected device in a network, according to an embodiment of the present disclosure.

FIG. 2 illustrates an example of a diagram for server-based reconnection of a disconnected device in a network, according to an embodiment of the present disclosure. Here, a device that was connected to a network, lost the connect to the network, and is in the process of reconnecting to the same network or a different network is referred to a provisionee. The computer system includes smart home cloud and a device setup service (e.g., a first computing service for managing home applications where the first computer service is hosted on a cloud system, and a second computing service for establishing the data connection and joining a home data network where the second computing service is hosted on another set of computing resources). The current state of the provisionee (not shown) is that the provisionee is connected to an access point of a network through a first network interface (e.g., Wi-Fi, etc.). As used herein, a network may be any type of network such as a local area network, peer-to-peer network, mesh network, or the like that utilizes any of one or more communication protocols such as, but not limited to, Wi-Fi, Bluetooth, Zigbee, or the like. The computer system generates an association between the provisionee and a user account stored or managed by the computer system. The computer system may generate the association upon the first time the provisionee is connected to a network (e.g., such as the network, etc.) that can transmit data to the computer system. Associating the provisionee with the user account can include receiving first data from the provisionee and determining that the first data corresponds to second data stored in the user account. As one example, the first data can include a serial number of the provisionee. The user account may include second data that corresponds to a purchase of a device having a serial number that matches the serial number of the first device. Different techniques are available to perform the association between the first device and the user account such as user input, matching data received by provisionee to data of the user account, a historical or newly generated confidence scores, and/or the like.

At any time after the computer system generates the association between the user account and the provisionee, the computer may receive first data from a device of the network that indicates the provisionee is in a disconnected state (e.g., a connection failure caused the provisionee to disconnect from the access point of the network). Here, the device is the provisioner. The first data can include the indication that the provisionee is experiencing a connection failure. The first data can include a cause of the connection failure (as determined by the provisionee). In some instances the computer device, using the first data, determines the cause of the connection failure. The first data can include additional data such as data associated with the cause of the connection failure, the status of the network, activity on the network, and the like. The additional data may transmitted to the provisioner from the provisionee and/or data collected by the provisioner. In one example, the cause of the connection failure can be a change in the credentials (e.g., service set identifier and/or password) used gain authorized access to the access point of the network.

The computer system uses the generated association between the provisionee and the user account and the first data to determine if the provisionee is authorized to reestablish a connection with the network. The association of the provisionee and the user account indicates an initial probability that the first device is authorized that can augmented using the first data. Data indicating the connection failure was intentionally caused, such as a change in credentials, service set identifier, or configuration of the network may lower the probability, while data indicating the failure was accidental, such as a version mismatch, known software or hardware bug, poor signal quality, may increase the probability. The probability can be compared to a threshold. If the probability exceeds the threshold, the first device can be authorized. In one example, if the connection failure is isolated to the provisionee the probability may be decreased (e.g., indicating the provisionee was intentionally disconnected from the network). If the connection failure was detected in other devices at approximately the same time as the connection failure in the provisionee the probability may increase (e.g., indicating that the connection failure is incidental rather than intentional). In another example, data that indicates the device has been disconnected for a long time interval may lower the probability (e.g., indicating the device may have been transferred to a new user).

Once authorized, the computer system transmits second data associated with reestablishing a connection between the provisionee and the network to the provisioner. The computer system can use the cause of the connection failure to determine what remedial action to perform. For instance, if the cause of the connection failure is a known bug in the software or hardware of the provisionee or a version mismatch (e.g., the provisionee is executing an old version software), the second data can include a software update. If the connection failure is caused by poor signal quality, interferences or the like, the second data can include instructions to connect to a proxy device, to switch frequency channels or frequency bands, to connect to a different network, or the like. If the cause of the connection failure is a change in credentials the second instructions can include updated credentials.

In one example, the computer system retrieves the updated credentials from a password locker. For instance, the computer system may store credentials of the networks that devices associated with the user account are connected to. The password locker can be updated through user input, through a notification from an access point of the network (e.g., through frustration-free setup), through a notification from a device that has been updated with updated credentials, or the like. The computer system may retrieve the updated credentials for the network (e.g., updated service set identifier and/or password) from the password locker and transmit the updated credentials as second data to the provisioner. The provisioner transmits the second data to the provisionee to cause the provisionee to reestablish a connection with the network.

In another example, the second data can include instructions that direct the provisioner to transmit the credentials stored by the provisioner to the provisionee. Since provisioner is connected to the network and the computer system the updated credentials of the network have already been stored in the provisioner. The provisioner can transmit the updated credentials directly to the provisionee device to cause the provisionee to reestablish a connection with the network.

Once the connection between the provisionee and the network is reestablished, the process may wait until another message is received indicating a connection failure and repeat the processes of FIG. 2.

Figure 3:
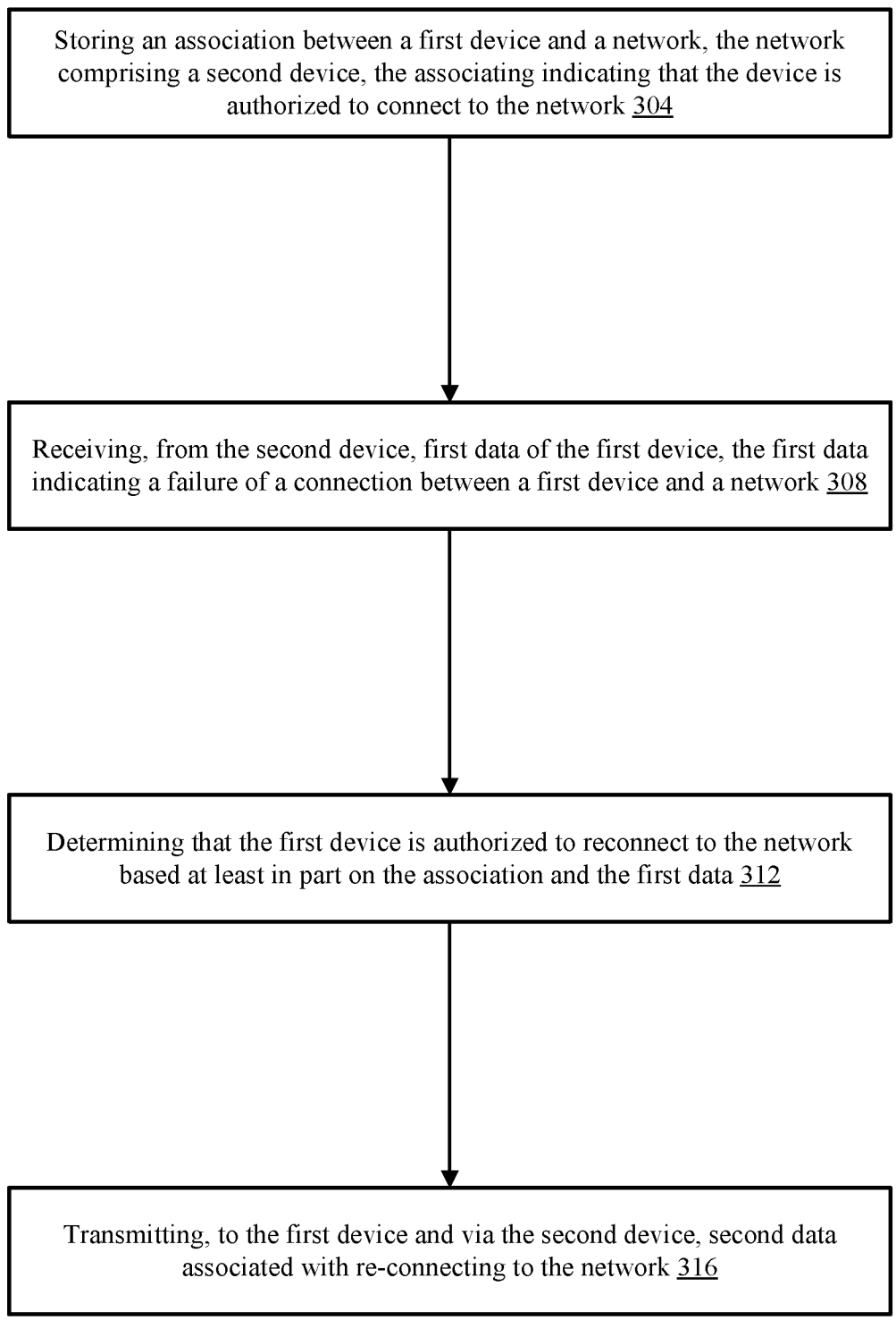
FIG. 3 illustrates an example of a process for server-based reconnection of a disconnected device in a network, according to an embodiment of the present disclosure.

FIG. 3 illustrates an example of a process for server-based reconnection of a disconnected device in a network, according to an embodiment of the present disclosure. The process of FIG. 3 can be an illustrative implementation of the diagram of FIG. 2.

At block 304, the computer system stores an association between a first device and a user account. The computer system may generate the association upon the first time the first device is connected to an access point of a network (e.g., a network, wide area network, personal area network, cellular network, or the like). The first device may connect to the network using a first communication interface (e.g., a wireless connection such as Wi-Fi, Bluetooth, Zigbee, or the like or a wired connection). Associating the provisionee with the user account can include matching an identifier of the first device with an identifier stored in the user account. Different techniques are available to perform the association between the first device and the user account such as user input, matching data received by provisionee to data of the user account, a historical or newly generated confidence scores, and/or the like.

At block 308, the computer system receives first data from a second device of the network that indicates the first device is in a disconnected state (e.g., a connection failure caused the first device to disconnect from the access point). The first data can include an indication of the connection failure in the first device and a cause of the connection failure (as determined by the first device). The first data can include additional data such as data associated with the cause of the connection failure, the status of the network, activity on the network, and the like. The additional data may be data received by the second device from the first device and/or data collected by the second device.

At block 312, the computer system determines that the first device is authorized to reconnect to the network based at least in part on the association of the first device with the user account and the first data. The computer system uses the authorization to prevent provisioning a malicious device or a device that is no longer possessed by a user of the network with the credentials to the network. Authorization may be performed by using the association between the first device and the user account (e.g., indicating an initial probability that the first device is authorized) and the cause of the connection failure. In one example, data indicating the connection failure was intentionally caused, such as a change in credentials, service set identifier, or configuration of the network may lower the probability, while data indicating the failure was accidental, such as a version mismatch, known software or hardware bug, poor signal quality, may increase the probability. The probability can be compared to a threshold. If the probability exceeds the threshold, the first device can be authorized. Otherwise, the first device may not be authorized and the computer system either terminates the process of FIG. 3 or requests user input to authorize the first device. In some instances, if there is insufficient data to authorize the first device, the computer system may instruct the second device to establish a secure connection with the first device and then query the first device and/or the second device for additional information.

At block 316, the computing system transmits second data associated with reconnecting the first device to the network to the first device via the second device. The computer system can generate second data to be transmitted to the second device to cause the second device to provision the first device. The computer system may generate second data based on the cause of the connection failure. For instance, if the cause of the connection failure is a known bug in the software of the first device or a version mismatch between the software version of the first device and a version identifier stored by the computer system, the second data can include a software update. If the connection failure is caused by poor signal quality, interferences or the like, the second data can include instructions to connect to a proxy device, to switch frequency channels or frequency bands, to connect to a different network, or the like. If the cause of the connection failure is a change in credentials the second data can include updated credentials or instructions for the second device to transmit the credentials stored by the second device to the first device.

In one example, the computer system may retrieve updated credentials for the network (e.g., updated service set identifier and/or password) from a password locker associated with the user account and transmit the updated credentials as second data to the second device. Transmitting the second data to the second device causes the second device to transmit the data to the first device and the first device to use the second data to reestablish a connection with the network. In another example, the second data can include instructions that cause the second device to transmit the credentials stored by the second device to the first device.

The process may return to block 304 and wait for another indication of a connection failure in a device of the network or otherwise terminate.

Figure 4:
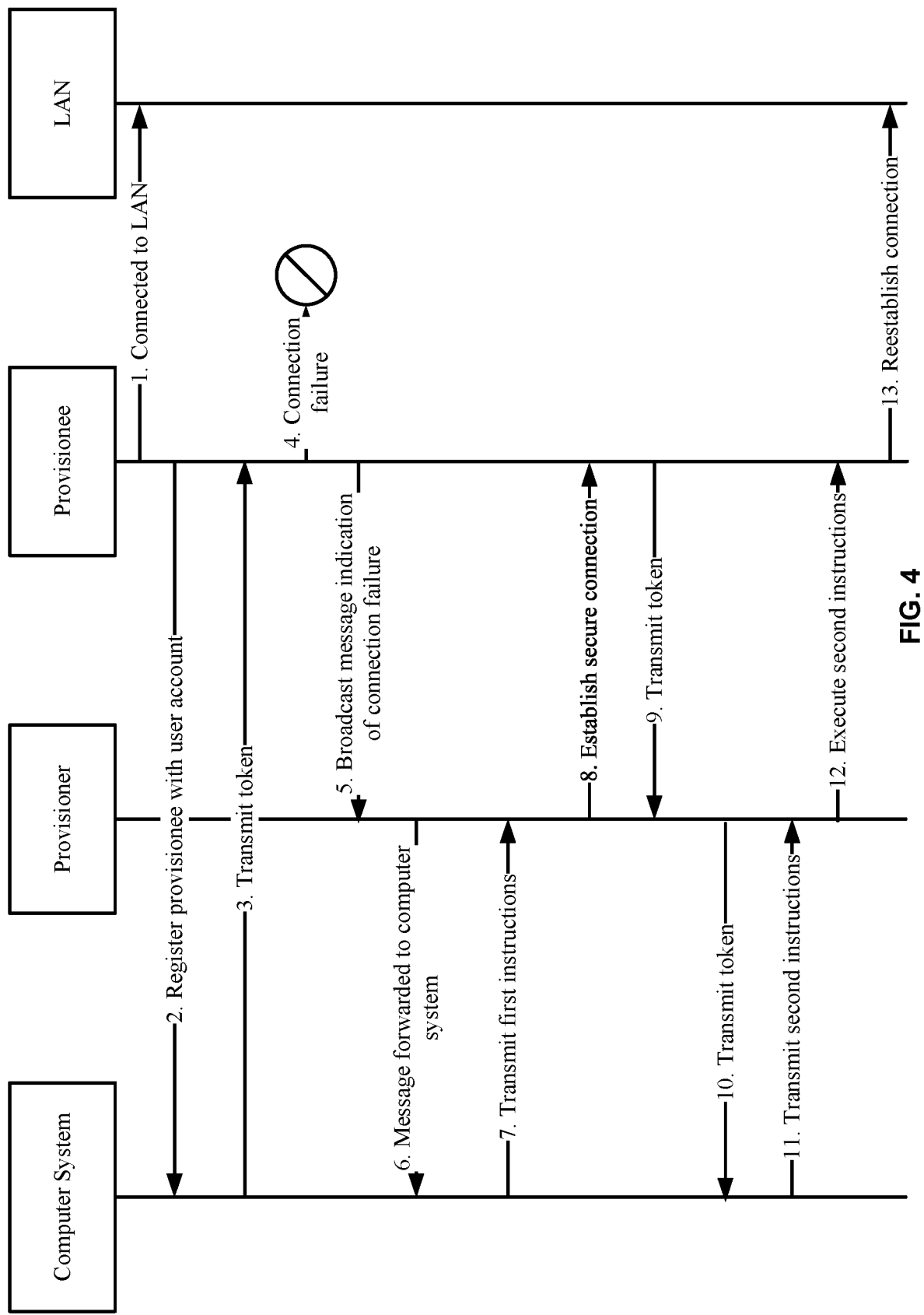
FIG. 4 illustrates an example of a diagram of a detailed embodiment of FIG. 2 for managing reconnections of devices in a network, according to an embodiment of the present disclosure.

FIG. 4 illustrates an example of a diagram of a detailed embodiment of FIG. 2 for managing reconnections of devices in a network, according to an embodiment of the present disclosure. Here, a device that was connected to a network, lost the connect to the network, and is in the process of reconnecting to the same network or a different network is the provisionee such as provisionee 104 from FIG. 1. The computer system includes smart home cloud and a device setup service (e.g., a first computing service for managing home applications where the first computer service is hosted on a cloud system, and a second computing service for establishing the data connection and joining a home data network where the second computing service is hosted on another set of computing resources) and can be an example of the computer system 120 of FIG. 1. As illustrated in FIG. 2, the current state of the provisionee is connected to an access point of a network through a first network interface (e.g., Wi-Fi). The provisionee stores a service set identifier of the network and the corresponding password. The provisionee may register with the computer system to associate the provisionee with a user account that is also associated with the network. This may occur upon the first time provisionee connects to a network (or device) that can reach the computer system. Once the computer system associates the provisionee with the user account, the computer system generates a token. The token can be transmitted to the provisionee and stored as a first token by the provisionee. The token is stored on the computer system as a second token. The token can be used to verify that the provisionee is authorized to reconnect to the network. With registration completed, the functionality of the device is enabled.

If the provisionee detects a connection failure with the network, the provisionee may perform a remedial action to reestablish a connection with the network. The provisionee will first attempt to reconnect to the network using the stored service set identifier and password. If a connection cannot be reestablished the provisionee may determine a cause of the connection failure. For instance, the provisionee can determine whether the password has changed, the service set identifier is detected, known software or hardware bugs that can cause connection failures identified before the connection failure, version mismatch identified prior to the connection failure (e.g., between a version a software or hardware version identifier stored on a server and the corresponding software or hardware version identifier stored by provisionee), and/or the like.

The provisionee may then transmit a beacon message (e.g., via a Bluetooth beacon or the like). The Bluetooth beacon is a broadcast message (e.g. receivable by devices in the vicinity of the provisionee). The beacon message comprises an indication of the connection failure of the provisionee and, optionally, the cause of the connection failure. The provisionee can include other data in the beacon message including, but not limited to a device identifier, device type, version information (e.g., hardware and/or software), and/or the like. A device of the network receives the beacon message. Here the device that receives the broadcast message is the provisioner such as provisioner 112 of FIG. 1. The provisioner transmits the beacon message to the computer system as a second message. The second message can be transmitted over a different communication protocol from the beacon message such as over Ethernet, Wi-Fi, or the like. The provisioner can embed additional information associated with the status of the network. The additional data can include, but is not limited to, the status of the network, the status of one or more access points, service set identifiers detected by the provisioner, activity of one or more devices of the network (e.g., data transmissions, disconnects, reconnects, etc.), and/or the like.

The computer system receives the second message from the provisioner and processes the data to determine whether the provisionee is authorized to reconnect to the network. The computer system may use one or more factors to determine a probability that the provisionee is authorized to reestablish a connection to the network. Examples of the one or more factors include, but are not limited to: a length of time in which the provisionee has been disconnected from the network, available networks and/or service set identifiers detected by the provisionee or provisioner, the cause of the connection failure, activity on the network (e.g., did other devices experience a connection failure, how many, did any reconnect, etc.), a historical confidence score associated with device and indicating that the provisionee is authorized to be on the network, a newly generated confidence score indicating the likelihood of the provisionee being authorized to be on the network, user preferences defining what devices can be connected to what networks (e.g., based on device types, device identifiers, or the like), a known software or hardware bug that is associated with the particular provisionee (e.g., the serial number of the like), and/or the like. The historical confidence score or newly generated confidence score may be calculated using any of the aforementioned factors. In one example, a weight may be assigned to each factor (e.g., such that factors that are less indicative of authorization or non-authorization do not overshadow those factors that are more indicative of authorization or non-authorization). The historical confidence score or newly generated confidence score may be calculated using weighted factors.

If probability is too low (e.g., below a predetermined threshold), the computer system can request additional information from the provisionee through the provisioner. The computer system may direct the provisioner to establish a secure connection with the provisionee (e.g., via Bluetooth, etc.) to enable bilateral communication with the provisionee at a higher bandwidth (then beacon messages). The request for the additional information and the response including the additional information may be received over the secure connection. In one example, the computer system can query the provisionee for a list of detected networks (e.g., service set identifiers), which can be compared with a stored list in the user account. In another example, the computer system can query the provisionee for the provisionee's serial number or UUID to determine if a software update is available for the provisionee. The computer system pushes the software update to the provisionee before attempting further remedial action.

The computer system then transmits first instructions to the provisioner that causes the provisioner to establish a secure connection with the provisionee (if it has not already done so). The computer system then transmits a request to provisioner that causes provisioner to transmit a request to provisionee for the first token. The provisionee transmits the first token over the secure connection to the provisioner, which then transmits the first token to the computer system. The computer system validates the first token by matching the first token to the second token. Upon matching the first token and the second token, the provisionee is validated as being authorized to reconnect to the network. The computer system transmits second instructions to the provisioner. In one example, the second instructions comprise updated data for provisionee such as an updated service set identifier and/or password, a software update, and/or the like. For instance, the computer system obtains the service set identifier and updated password from a password locker associated with the user account. In another example, the second instructions direct the provisioner to transmit the service set identifier and password stored by the provisioner to the provisionee. In still yet another example, the second instructions can be retransmitted from the provisioner to the provisionee. The second instructions can be executed by the provisionee to obtain updated credentials or obtain a software update, or the like. The provisionee receives the second instructions and uses the second instructions to reestablish a connection with the network.

Figure 5:
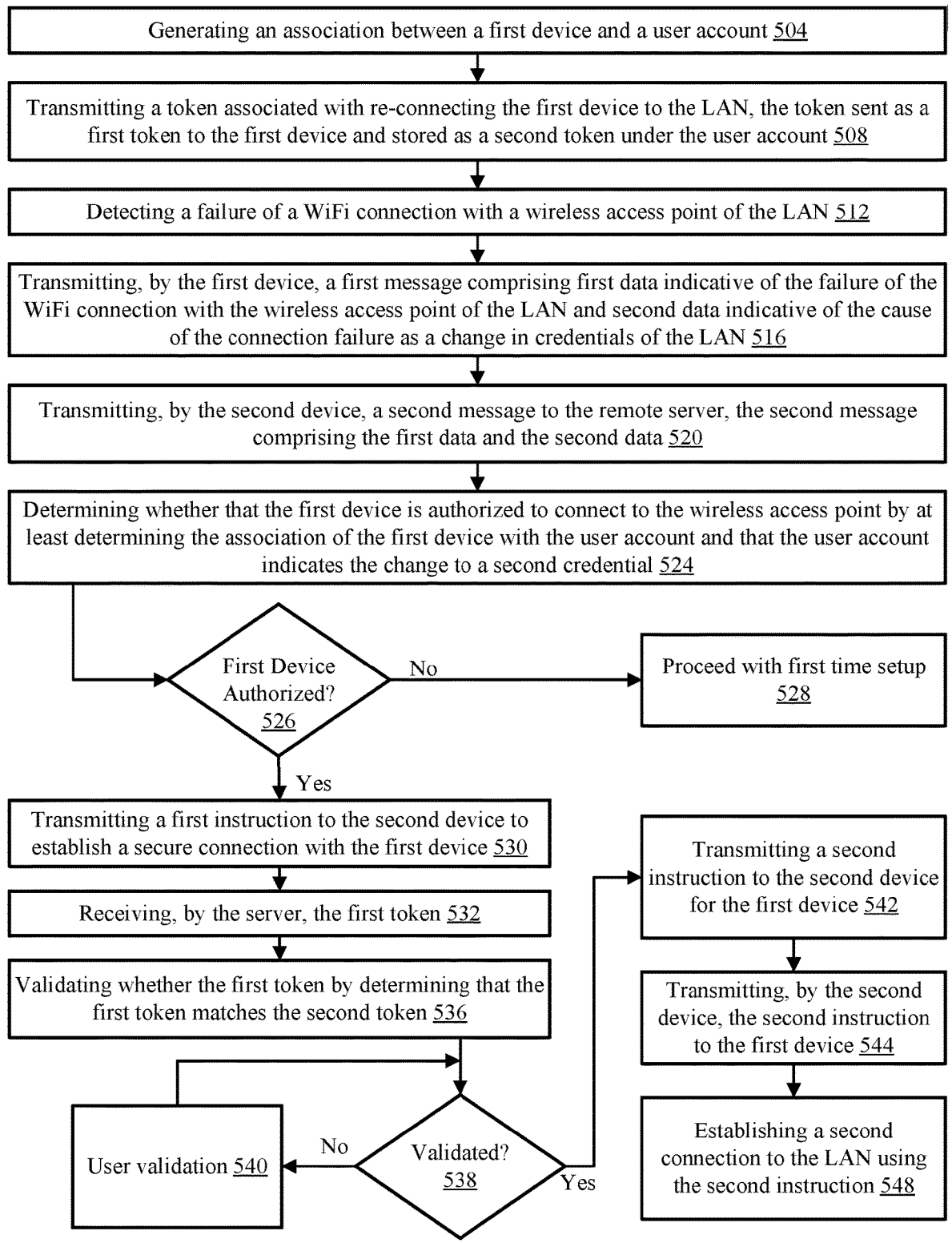
FIG. 5 illustrates an example of a process of a detailed embodiment of FIG. 3 for managing reconnections of devices in a network, according to an embodiment of the present disclosure.

FIG. 5 illustrates an example of a process of a detailed embodiment of FIG. 3 for managing reconnections of devices in a network, according to an embodiment of the present disclosure. The network may support a variety of devices include desktop and laptop computers, tablets, mobile devices, internet of things (IoT) devices (such as a smart speaker, a smart appliance, a smart control system (e.g., a thermostat), a smart set top box, a smart television, a smart sensor, and the like), wired devices, wireless devices, and the like. The device (referred to herein as the provisionee or first device) may be any device connected to the network that has lost its connection to the network, and is in the process of reconnecting to the same network or a different network. The provisioner (also referred to as the second device) may be any device connected the network and in proximity to the first device.

At block 504, a computer system generates an association between a first device and a user account. The association includes data indicating that the user device is registered under the user account. For instance, the data can include an identifier of the device (e.g., the device's serial number, media access control (MAC) address, a UUID, or the like) and is stored under the user account. In some instances, the association can also include indication that the first device has been connected to the network, which is associated with the user account. The computer system may generate the association upon the first time the first device connects to the network (e.g., such as network, etc.) that can transmit data to the computer system. The first device may use a Wi-Fi connection with an access point of the network. The association provides an indication that the first device is authorized to access the network. As one example, the user account may include a data record that corresponds to a purchase of a device having a seral number that matches the serial number of the first device. The computer system can determine with a high probability that the first device is the device that was purchased by the user, which is likely authorized to connect to the network of the user.

At block 508, the computer system transmits a token associated with re-connecting the first device to the network to the first device. The token is transmitted as a first token to the first device and stored as a second token under the user account. The token provides an indication of the association of the first device with the user account. If the first device is deregistered from the user account or if the first device is reset to factory settings, the tokens will not match. The computer system then prevents the first device from reestablishing a connection with the network. This can prevent an old device from being used to gain unauthorized access to the network.

At block 512, the first device detects a connection failure of a Wi-Fi connection with the access point of the network. In one example, the first device may determine a cause of the connection failure such as a change in a credential (e.g., a service set identifier or password of the network). For instance, the first device may attempt to reestablish a connection with the access point using the credentials stored in the first device. The access point may return a message that indicates that access was denied due to an incorrect password. In another instance, the first device may transmit a message over a different network and/or using a different network interface. For example, some devices of the network may operate a Bluetooth mesh network as separate network from the network. The first device may transmit query over the Bluetooth mesh network to computer system (or another remote computing system) to determine if a credential has changed, if there is a known software or hardware bug that may affect connectivity, if activity on the network indicates that the connection failure is isolated to the first device or extends other devices, etc. In still yet another instance, the first device may determine the cause of the connection failure by determining if the service set identifier can be detected (e.g., indicating the access point is not operational or that the service set identifier has been changed).

At block 516, the first device transmits a first message via a Bluetooth beacon to Bluetooth devices proximate to the first device. One such device that receives the Bluetooth beacon is here referred to as a second device. The first message can include an indication that a connection failure at the first device has disconnected the first device from the network and a cause of the connection failure. The first device may also include other data in the first message such as service set identifiers of detected networks and the like that can be used to determine a cause of the connection failure and/or to establish a connection with the network. Since the packet size of a Bluetooth beacon is limited (e.g., to approximately 31 bytes), if the first device determines that the data size of the first message exceeds the maximum packet size (or a multiple thereof), the first device may only include the indication of the connection failure in the first message to reduce the number of packets that would need to be transmitted and received by the second device. The cause of the connection failure may be stored in the first device for use later such as when a higher throughput connection can be established and/or when computer system queries the first device for the information At block 520, the second device receives the first message in the beacon and process the first message for retransmission as a second message to the computer system. The second message may be transmitted over a connection with the network such as Wi-Fi. Since the network supports a larger packet size, the second device may include additional information in the second message before transmitting the second message to the computer system. For instance, the second device can include a status of the network, a length of time since the first device was disconnected from the network, activity on the network (e.g., whether other devices have recently disconnected, reconnected, etc.), or the like. The second device transmits the second message over via the network to the computer system. In some instances, the second message may only include the contents of the first message as the computer system can query the second device and/or the first device for additional information.

At block 524, the computer system receives the second message and determines whether the first device is authorized to reconnect to the network. The computer system prevents malicious devices from using the remedial processes of FIG. 5 to gain unauthorized access to the network. For instance, if the first device was discarded (or otherwise intentionally removed from the network) by a user associated with the network, the computer system will prevent the first device from gaining updated credentials (or other data) to connect to the network. The computer system may use one or more factors to determine whether the first device is authorized to reconnect to the network. The one or more factors may be weighted (with some factors being better predictors for authorization then others). Examples of factors include, but are not limited, whether the first device is associated with a user account stored by the computer system (e.g., a serial number or other UUID matches a record stored by the user account), whether the first device has been deregistered, a length of time that the first device has been disconnected from the first network, available networks or service set identifiers (e.g., detected by the second device or known to the computer system), cause of the connection failure (e.g., including whether a cause identified by the first device matches data stored under the user account and indicating known changes to the network), activity on the network (e.g., whether other device have recently disconnected, attempted to reconnect, or reconnected, etc.), a historical confidence score, a new confidence score, user preference (e.g., that particular device types are authorized or not authorized), a known software or hardware fault, version identifier of the hardware or software of the first device, and the like.

The one or more factors may be based on the information included in the first message, the second message, and data stored by the computer system. If the computer system is unable to determine that the first device is authorized (e.g., too little information), the computer system may direct the second device to establish a secure connection with the first device (e.g., over Bluetooth, Wi-Fi, etc.). The computer system may then query the first device and/or the second device for additional information.

In one example, if the first device is deregistered with the user account then the computer system determines that the first device has a low probability of being authorized. The first device being intentionally removed from the user account may indicate the user has transferred the first device to a new user. In another example, the computer system may determine that since the first device was only recently disconnected from the network and other devices of the network were also recently disconnected from the network, it is likely that the connection failure was an unintentional consequence of a credential change (or other such change in the configuration of the network). The computer system may then determine with a high probability that the first device is authorized to connect to the network.

In still yet another example, the computer system may determine that the first device has not connected to the network in a long time and activity of the network does not indicate other devices as having connectivity errors. The computer system may determine that there is a low probability or medium probability that the user device is authorized to connect to the network. For instance, the first device may not have connected to the network due to being transferred to another user or discarded. In that instance, the first device should be prevented from accessing the network.

The computer system may compare the probability to a threshold value to determine if the first device is authorized to access the network. The threshold value may be set high to ensure that devices that have a chance of being malicious can be prevented from accessing the network. If the probability does not exceed the threshold value, the computer system can request user input (e.g., via a user interface of the second device or another device associated with the network) to provide a confirmation that the first device is authorized to reconnect to the network (or may increase the probability). User input indicating the confirmation may override a low or medium probability. Although the probability is described above as including three-levels (e.g., low, medium, and high), the probability can be represented as integer (e.g., between 0 and 100) or as a real number (e.g., between 0 and 1).

At 526, if the computer system determines that the first device is authorized then the process continues to block 530. If the computer system is unable to authorize the first device, the process moves to block 528.

At block 528 upon determining that the first device is unable to be authorized, the computer system transmits to the first device via the second device an indication that the first device is to enter a first time setup process. During the first time setup process, the first device acts as a hotspot (e.g., via Bluetooth, Zigbee, Wi-Fi, etc.). A user operated device (e.g., the second device, another device of the network, or some other device) connects to the hotspot and provisions the first device directly. The first time setup process can request from the user operated device user input that generates an association with between the first device and the user account. Once completed, the user operated device can transmit the association to the computer system or to another device.

Alternatively, upon determining that the first device is unable to be authorized, the computer system may request user input from a user device (e.g., such as the second device, another device of the network or some other device associated with the user of the network). If the user input authorizes the device then the process continues to block 530.

At block 530 upon determining that the first device is authorized, the computer system transmits a first instruction to the second device to establish a secure connection with the first device. The secure connection may be a peer-to-peer connection over Wi-Fi, Bluetooth, Zigbee, or the like. The secure connection enables bilateral communications between the first device and the second device with a higher bandwidth such that the first device may transmit additional data (and of a larger size) to the second device.

In some instances, the first device may determine that the second device and/or the computer system are authorized devices such that it is safe to establish the secure connection. The provisioner may use tokens, public-key cryptography, a zero knowledge proof, or the like to determine whether the second device and/or the computer system are authorized devices. Once, the first device determines the connection request is from an authorized device, the first device finishes the process of establishing the secure connection with the second device.

In some instances, the computer system can aggregate data from other devices and networks in a same geographic area as the first device and determine whether to proceed with transmitting instructions to the first device or wait for a better time interval. For instance, the computer system can receive service data from the first device, devices with similar attributes as the first device within a same geographical area of as the first device, the second device, other devices of the network, other networks in the same geographical area as the first device, devices connected to a same internet service provider, devices having a network locations that are within a sub-network range, etc. The service data can indicate the network connectivity status of the transmitting device as well as the network connectivity of nearby networks. The computer system can use the service data to determine a state of the networks in the geographic area in addition to the state of the network of the first device at the time in which the first device detects the network failure. For example, the computer system can detect an indication of a service failure (e.g., a potential security issue such as a distributed denial of service attack, a hack or the like, or a network outage locally such as at an access point or globally such as at the internet service provider).

The computer system uses the network status of the networks in the geographic area of the first device to determine whether to continue reconnecting the first device or to delay. If there is a service failure in the geographic area of the first device, the computer system can delay transmitting further instructions to reconnect the first device. This can protect the first device from malicious activity on the network (e.g., hacking, unauthorized network access, etc.) and prevent the computer system from consuming resources to reconnect the first device when reconnection may not be possible until the service failure is corrected. The delay may be for a predetermine time interval (e.g., an hour, a day, etc.), until a notification is received that the service failure is corrected (e.g., from other devices or networks in the geographic area reporting network connectivity and/or that any security issues are no longer present), or until user input is received. The computer system may execute a delay here or during any block of the process of FIG. 5 based on the status of the networks in the geographic area.

At block 532, the computer system receives the first token from the first device via the second device. In some instances, the first device may transmit the first token to the second device in response to a request for the first token by the computer system and the second device may retransmit the first token to the computer system. In other instances, the first device may transmit the first token in response to the secure connection being established.

At block 536, the computer system determines whether the first device is validated by comparing the first token to the second token stored by the computer system. If the tokens match (e.g., the first token is validated), then the first device is validated. The tokens provide an indication that the first device is still associated with the user account. For instance, if the user device is deregistered with the user account, then the second token may be deleted or altered to a predetermine value (e.g., setting all the bits to zero, setting the value to null, or the like) such that when the first token is compared with the second token, the tokens will not match. If the first device is reset to factory settings (e.g., deleting the first token), then the computer system determine that the first device should not be reconnected. In some instances, the tokens may be persistent until the first device is reset or deregistered. In other instances, the tokens may be single use. In those instances, once the tokens are used (e.g., compared to each other), the computer system may generate a new token for storage as a new first token in the first device and as a new second token by the computer system.

In some instances, the a same token may be generated for each device of the network to enable the devices of the network to validate devices of the network such as the first device. In those instances, the first device transmits the first token to the second device. The second device may compare the first token to the token stored by the second device (rather retransmitting the first token to the computer system). The second device may then transmit an indication to the computer system and/or the first device that the tokens match (e.g., the first device is still associated with the user account and is validated) or that the tokens do not match.

At block 538, it is determined whether the first device is validated based on whether the first token matches the second token. If the first token matches the second token, then the process continues at block 542. If the tokens do not match then the process continues at block 540 to obtain additional information to validate the first device.

At block 540 after it is determined that the first token does not match the second token, the computer system transmits a request for user input to validate the first device (e.g., confirming that the first device is authorized to access the network and/or confirming that the first device is still associated with the user account). The process then returns to block 538 in which the user input is used to validate the first device. If the user input does not validate first device then the secure connection between the first device and the second device is terminated and the process of FIG. 5 terminates. If the user input validates the first device then the process continues to block 524. In some instances, if user input already authorizes the first device, validation of the first device (e.g., blocks 532-540) may be skipped. For instance, if user input is received to expressly authorize the first device at any of blocks 524-528, then the user input authorizing the first device can be used in place of matching the first token to the second token.

At block 542 after validating the first device, the computer system transmits a second instruction to the first device via the second device to enable the first device to reestablish a connection with the network. The computer system may store a password locker in or in association with the user account. The password locker may store the service set identifier and password of networks associated with the user account. The password locker can be updated through user input, through a notification from an access point of the network (e.g., through frustration-free setup), through a notification from a device that has been updated with updated credentials, or the like. The computer system may retrieve the updated credentials for the network (e.g., updated service set identifier and/or password) and transmit the updated credentials as a second instruction to the second device. Alternatively, the computer system may instruct the second device to transmit the updated credential stored by the second device to the first device.

In some instances, if the computer device determines the network is being disrupted, then the computer system may delay transmitting the second instructions. This delay may occur in addition or in place of the delay introduced at block 530. The computer system may resume operations (e.g., transmitting the second instructions) upon a predetermined time interval passing or upon receiving a notification that the network disruption has ceased.

At block 544, the second device transmits the second instructions to the first device over the secure connection. The second instructions can include credentials for the network (e.g., a service set identifier, password, updated service set identifier, and/or updated password), a software update, instructions to connect to a particular proxy device (including credentials to secure connected to the proxy device), instructions to connect to a particular network via a particular channel or frequency band, instructions to connect to particular access device of the network, instructions to connect via a particular network interface (e.g., Bluetooth, Wi-Fi, Zigbee, etc., and/or the like.

At block 548, the first device uses the updated credential in the second instructions to reestablish a connection with the network (e.g., using the same access point, a different access point, using a proxy device, over a same frequency band, a different frequency band, etc.). The secure connection with the second device may be terminated before using the updated credential to reestablish a connection with the network or the secure connection may be terminated after the connection with the network is reestablished. The first device may transmit an indication to the computer system (via the network) that the first device has reestablished a connection with the network. If the tokens are single-use tokens, the computer system may generate a new token and transmit the new token to the first device for use the next time the first device has a connection failure. With the first device connection to the network, the process terminates.

Figure 6:
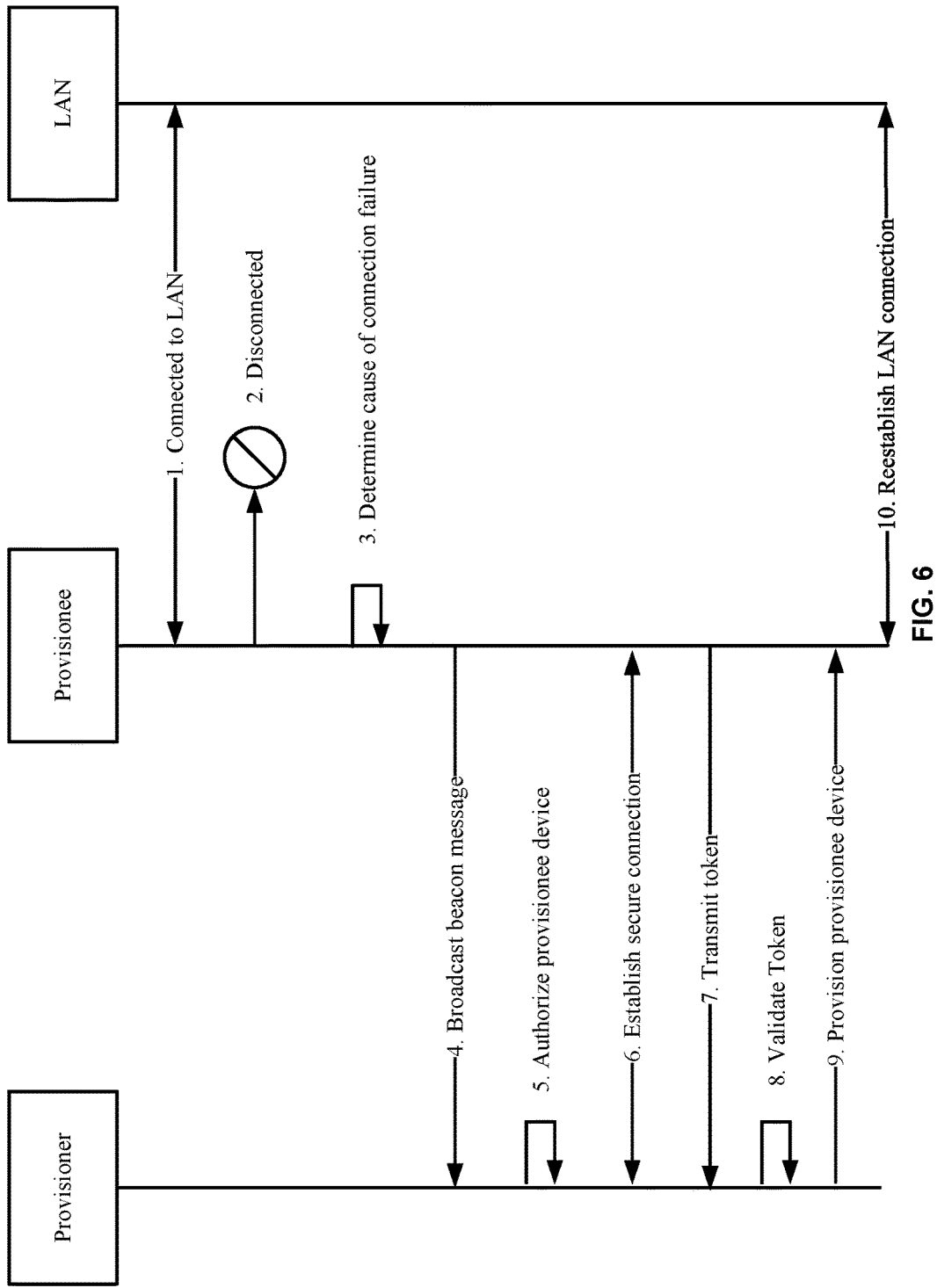
FIG. 6 illustrates an example of a diagram for a provisioner device that manages reconnection of disconnected devices of a network, according to an embodiment of the present disclosure.

FIG. 6 illustrates an example of a diagram for a provisioner device that manages reconnection of disconnected devices of a network, according to an embodiment of the present disclosure. In this example, the provisioner controls the authorization and provisioning of a provisionee device instead of a computer system as depicted and described in FIG. 2 and FIG. 4. Here, a device that was connected to a network, lost the connect to the network, and is in the process of reconnecting to the same network or a different network is the provisionee and the other device is referred to as the provisioner. The provisionee is connected to a network and operational (e.g., the functionalities of the provisionee are available). The provisionee connects to the network through a first communication interface (e.g., Wi-Fi, Ethernet, etc.).

In response to a connection failure, the provisionee performs a remedial action to reestablish a connection with the network. The provisionee may attempt to reconnect to an access point of the network. If reconnecting is unlikely or impossible (e.g., the access point indicates the password is incorrect, the service set identifier of the network is no longer within a communication range of the provisionee, etc.) or at the expiration of a predetermined time interval, the provisionee will report a disconnected state and request an update from a remote device such as computer system 120 of FIG. 1. In some instances, the provisionee may continually attempt to reconnect to the network (throughout the process of FIG. 6) and if successful (at any time), the provisioning process may terminate.

The provisionee determines a cause for the connection failure by processing data associated with the network and the provisionee. The provisionee may determine that the service set identifier is no longer within a communication range of the provisionee (e.g., access point is disabled or unreachable), whether a credential has been changed (e.g., password attempt is reported as incorrect), signal quality (e.g., can detect the access point, but signals is too weak), radio interference, a version mismatch (e.g., access point responds to connection attempts with error message), whether other networks are available or within a communication range (e.g., if other networks were within a communication range and are no longer within a communication range then the error may in the provisionee, but if the networks are still within a communication range of the provisionee the error may be elsewhere), and the like.

In one example, the devices of the network can operate a mesh network using a different communication protocol from the access point such as Bluetooth. The provisionee can connect to this mesh network and request network diagnostic information from the other devices or transmit an indication of the provisionee's disconnected state to a remote device such as the computer system. The computer system may respond with an indication as to the cause of the connection failure such as indicating that the password of the network has changed.

If frustration-free setup (FFS) is supported by an access point of the network, the provisionee may connect to a hidden network operated by the access point. Access points that support FFS operate a hidden network (e.g., the service set identifier is not broadcast or discoverable by a network interface) that can be used to provision devices (e.g., automatically configure those devices to enable those devices to access the network). The hidden network may limit inter-device communications and communications to other networks (e.g., the Internet, etc.) to prevent a device from using the hidden network to gain unauthorized access to the network. If the access point support FFS, the access point is the provisioner rather than another device of the network.

If FFS is not supported (or in addition to using FFS provisioning), provisionee transmits a Bluetooth beacon (or a message over another communication channel such as Wi-Fi, Zigbee, or the like) to devices within range of the Bluetooth beacon. The Bluetooth beacon can include first data that includes an indication of the connection failure and the cause of the connection failure. The Bluetooth beacon may be received by at least one device of the network (e.g., provisioner). The provisioner determines if the provisionee is authorized by comparing the data of the Bluetooth beacon with data associated with the provisionee stored by the provisioner or obtained by a computer system (e.g., length of time provisionee was within a communication range of provisioner before disconnecting, provisionee association with a user account that is also associated with the network or provisioner, a serial number of the provisionee matching a white list of accepted device or corresponding to an pre-approved device type, and the like. The provisioner determines if provisionee is authorized to connect to the network. Alternatively, or additionally, the provisioner can retransmit the data in the beacon message to the computer system which may compare the data to data stored in a user account. The computer system may return, to the provisioner, an indication that provisionee is authorized.

Once authorized, the provisioner establishes a secure connection with the provisionee. The secure communication enables a higher throughput data transmission between the provisioner and the provisionee and secures the data transmitted between provisioner and provisionee to prevent the data from being access by another device.

With the secure connection is established, the provisionee sends a token over the secure connection. The token validates the association between the provisionee and the user account. The token may be generated when during a registration process (e.g., when the provisionee is first connected to the network). The token may be stored as a first token by the provisionee and as a second token by the computer system. In some instances, each device of the network that is associated with the user account may store the first token associated with the device and the second token associated with the other devices of the user account that are connected to the network. This enables other devices, such as the provisioner, to validate the tokens of the provisionee without having to pass on the tokens to the computer system. If the second token is stored by provisioner, then provisioner compares the received first token with stored second token. If the provisioner does not store the second token of the provisionee, the provisioner transmits first token to the computers system and the computer system performs the comparison. If the tokens do not match, then the provisionee is no longer associated with the user account (e.g., has been deregistered by the computer system or reset). The provisioner (or computer system) may request user input to confirm that the provisionee should be authorized to connect to the network.

If the first token matches the second token, then the association of the provisionee with the user account is validated and provisionee the provisioner transmits instructions to the provisionee that cause the provisionee to reestablish a connection with the network. For instance, the instructions can include updated credentials stored by provisioner. In some instances, the instructions may be based on the cause of the connection failure. For instance, if the cause of the connection failure is a known bug in the software or hardware of the first device or a version mismatch between the software version of the first device and a version identifier stored by the computer system, the instructions can include a software update. If the connection failure is caused by poor signal quality, interferences or the like, the instructions can include instructions to connect to a proxy device, to switch frequency channels or frequency bands, to connect to a different network, or the like. If the cause of the connection failure is a change in credentials the instructions can include updated credentials or instructions for the second device to transmit the credentials stored by the second device to the first device.

The provisionee receives the instructions from the provisioner and uses the instructions to reestablish a connection with the network. The instructions cause the provisionee to establish a connection with a same access point that the provisionee previously connected to, to a different access point, to a proxy device, to a different network (such as one operating a different frequency band or by a different communication protocol, etc.), or the like.

FIG. 7 illustrates an example process for managing reconnection of disconnected devices of a network using a provisioner device, according to an embodiment of the present disclosure. The process of FIG. 7 can be an illustrative implementation of the diagram of FIG. 6.

At block 704, a first device generates an association with a user account associated with a network. The first device may generate the association with the user account upon connecting to the network for the first time. The first device may generate the association by transmitting identification information (such as a serial number or UUID) to a remote device such computer system 120 of FIG. 1 where the identification information may be stored in the user account. In response to generating the association, the first device receives a token that can be used to validate the association.

At block 708, the first device detects a connection failure of a connection with the network. The first device may attempt to reconnect to an access point of the network. If the first device determines that reconnecting is unlikely or impossible (e.g., the access point indicates the password is incorrect, the service set identifier of the network is no longer within a communication range of the provisionee, etc.) or at the expiration of a predetermined time interval, the first device enters a disconnected state.

At block 712, the first device determines a cause of the connection failure. The first device may determine the cause by receiving an error message generated by the first device or from another device. In one example, an error message is generated by the access point and indicates that the credentials used to connect to the access point are incorrect. Other error messages can indicate a version mismatch indicating that software of the first device is not the most recent version of the software, a software or hardware fault in the first device, the first device being unable to detect the network or other networks that were previously detectable, and the like.

At block 716, the first device transmits a Bluetooth beacon (or a broadcast message via Wi-Fi, Zigbee, or the like). The Bluetooth beacon can include the indication of the connection failure in the first device and the cause of the connection failure. The beacon may be received by a second device and one or more other devices proximate to the first device. The beacon may include additional information associated with the first device or the connection failure such as device identifier, version numbers of hardware or software, signal strength, a list of networks detected by the first device, a list of devices detected by the first device, an amount of time since the first device disconnected from the access point, an amount of time that the previous connection was active before disconnecting, and the like. The information in the beacon is used to determine if the first device is authorized to access the network. The authorization may be determined in terms of probability (e.g., the probability that the first device is authorized). If there is insufficient information to generate a probability (or if the probability does not exceed a threshold for determining authorization), the first device may be queried for additional information. If the probability is still does not exceed the threshold, user input may be requested via an interface of the second device or another device of the network. The user input may provide a definitive indications as whether the first device is authorized.

At block 720, the first device, response to it being determined that the first device is authorized, may be instructed to establish a secure connection with the second device. The secure connection enables a higher throughput for data transmitted between the first device and the second device. Also, since the connection is secured, unlike the beacon, data transmitted cannot be intercepted by other devices.

At block 724, the first device transmits the token over the secure connection to the second device. The token may be compared to another token stored on the second device or the computer system to ensure that the first device is still associated with the user account.

At block 728, in response to the token matching the other token, the first device receives first instructions. The first instructions enable the first device to reestablish a connection with the network based on the cause of the connection failure. For instance, if the connection failure was caused by a change in a password of the access point, the first instructions will include the service set identifier of the network and the new password. The first instructions may include different data for other causes of the connection failure. For instance, the first instructions can include a software update (or data that causes a software update), to access a different network, to access the network using a proxy or a different access point, to use a different communication interface, change frequency channels or bands, or the like.

At block 732, the first device uses the first instructions reestablish a connection with the network. The process may then terminate until a subsequent connection failure is detected.

FIG. 8 illustrates an example of a process for reestablishing a connection in disconnected device of a network, according to an embodiment of the present disclosure. Here, the provisionee executes much of the processes to reestablish a connection to the network that were previously executed by the computing device (e.g., as in FIGS. 2-5) and/or the provisioner (e.g., as in FIGS. 6-7).

At block 804, the beacon message is received from a first device. The beacon message indicating a connection failure in the first device that caused the first device to disconnect from a network. The beacon may be a Bluetooth beacon or the like. The beacon may be received by a second device and one or more devices that are proximate to the first device. In some instances, each of the receiving devices may execute the provisioning process. In other instances, the second device may receive an indication from the first device that the second device is to perform the provisioning.

At block 808, the second device transmits the beacon as a second message to a computer system. The second message can correspond to the beacon message but repackaged for transmission using a communication protocol of the network such as Wi-Fi. The second message may include additional information captured by the second device such as activity of devices on the network, networks within a communication range, signal strengths, etc.

At block 812, the second device receives first instructions to establish a secure connection with the first device. The first instructions may be received in response to a determination that the first device is authorized to access the network based on the first device being deemed safe or based on the first device being associated with a user account that is also associated with the network.

At block 816, the second device receives a token from the first device.

At block 820, the second device transmits the token to the computer system.

At block 824, the second device receives second instructions from the computer system to provision the first device. The second instructions may be based on the cause of the connection failure. In one example, if the cause is a change in credentials, the second instructions can include the service set identifier and updated password of an access point of the network, instructions on where to obtain the service set identifier and the updated password, instructions to transmit the service set identifier and password used by the second device to the first device, or the second instructions may include some of the information with direction on how to obtain the rest of the information (e.g., the second instructions may include the service set identifier with instructions on where/how to obtain the updated password).

At block 828, the second device uses the second instructions to provision the first device. Provisioning can include transmitting credentials to the first device, transmitting programming instructions for execution by the first device, or transmitting instructions that enable the first device to reestablish a connection with the network. The second device may receive an indication that the first device has reconnected to the network and in response, terminate the secure connection with the first device.

Figure 9:
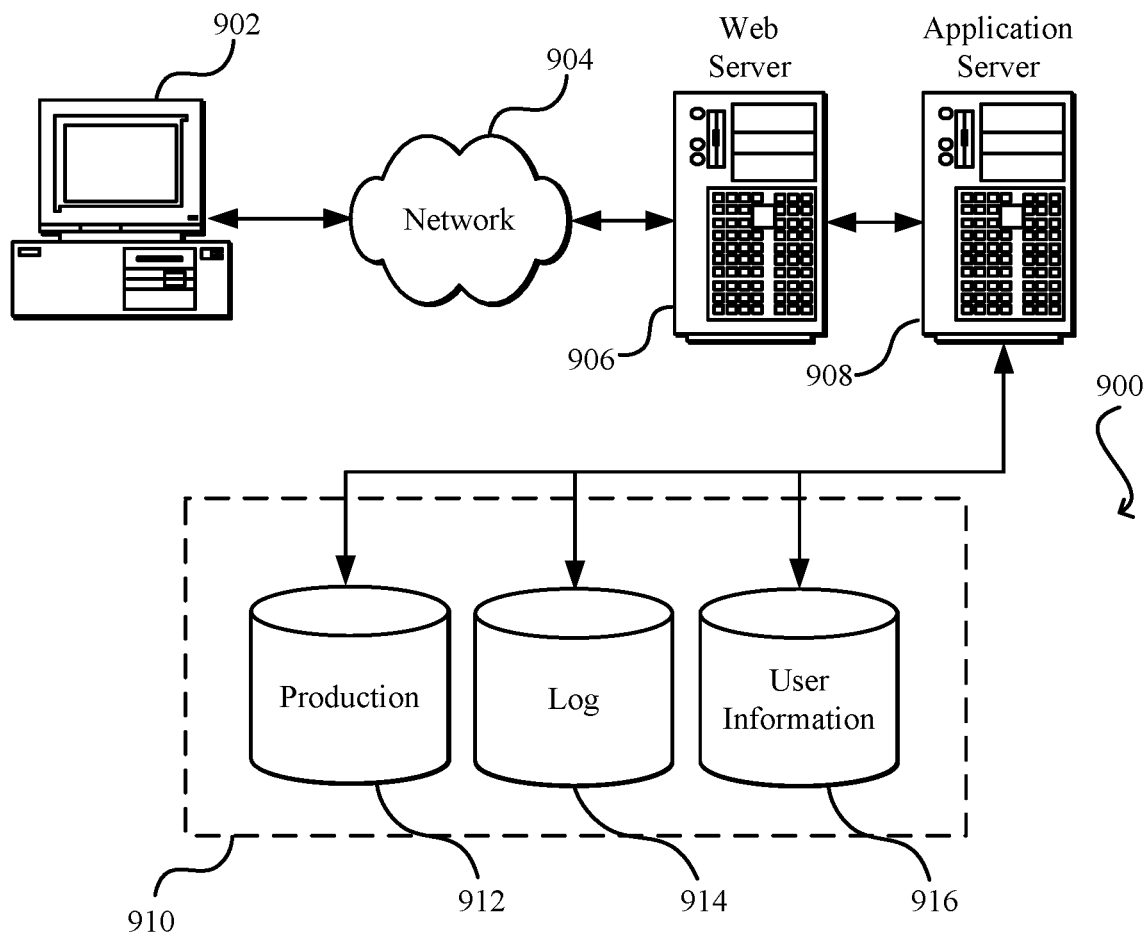
FIG. 9 illustrates a computer architecture diagram showing an example computer architecture, according to an embodiment of the present disclosure.

FIG. 9 illustrates a computer architecture diagram showing an example computer architecture, according to an embodiment of the present disclosure. This architecture may be used to implement some or all of the systems described herein. The computer architecture shown in FIG. 9 illustrates a server computer, workstation, desktop computer, laptop, tablet, network appliance, personal digital assistant ("PDA"), e-reader, digital cellular phone, or other computing device, and may be utilized to execute any aspects of the software components presented herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a random access memory ("RAM") 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the network 920. The chipset 906 may include functionality for providing network connectivity through a NIC 912, such as a gigabit Ethernet adapter. The NIC 912 is capable of connecting the computer 900 to other computing devices over the network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs and data utilized by the computer 900. The mass storage device 918 might also store other programs and data not specifically identified herein.

In one embodiment, the mass storage device 918 or other computer-readable storage media is encoded with computer-executable instructions which, when loaded into the computer 900, transforms the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9. It should also be appreciated that many computers, such as the computer 900, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   generating, by a remote server, an association between a first device and a user account, the user account being associated with a network (LAN) that comprises a wireless access point and a second device;
   transmitting, by the remote server to the first device, a token associated with re-connecting the first device to the LAN, the token sent as a first token to the first device and stored as a second token under the user account;
   detecting, by the first device, a connection failure of a WiFi connection with the wireless access point;
   determining, by the first device, that a first cause of the connection failure comprises a change to a credential for accessing the LAN;
   transmitting, by the first device, a first message comprising data indicative of the connection failure and of the first cause of the connection failure;
   transmitting, by the second device, a second message to the remote server, the second message comprising the data;
   determining, by the remote server, that the first device is authorized to reconnect to the wireless access point by at least determining the association of the first device with the user account;
   transmitting, by the remote server, a first set of instructions to the second device to establish a secure connection with the first device;
   receiving, by the second device and from the first device over the secure connection, the first token;
   transmitting, by the second device to the remote server, the first token;
   determining, by the remote server, that the first token matches the second token;
   transmitting, by the remote server to the second device, a second set of instructions to provide a second credential associated with accessing the LAN to the first device;
   transmitting, by the second device, the second credential to the first device; and
   establishing, by the first device and by using the second credential, a second connection to the LAN.

2. The computer-implemented method of claim 1, wherein determining that the first device is authorized to reconnect to the wireless access point further includes:
   determining, by the remote server and based on the user account, a second cause of the connection failure; and
   determining that the first device is authorized based on the first cause of the connection failure matching the second cause of the connection failure.

3. The computer-implemented method of claim 1, further comprising:
   receiving, by the remote server, a service set identifier and the second credential for the network;
   storing, by the remote server, the service set identifier and the second credential in the user account;
   determining, by the remote server, in response to receiving the second message, the service set identifier from the data;
   determining, by the remote server and from the user account, that the credential for the service set identifier has been changed to the second credential;
   retrieving the second credential for the service set identifier; and
   generating the second set of instructions to include the second credential.

4. A computer-implemented method comprising:
   storing an association between a first device and a network, the network comprising an access point and a second device connected with the access point, the association indicating that the first device is authorized to be on the network;
   receiving, from the second device, first data of the first device, the first data providing an indication of a failure of a previously established connection between the first device and the network;
   determining, based at least in part on the association and the first data, that the first device is authorized to reconnect to the network; and
   transmitting, to the first device and via the second device, second data associated with reconnecting the first device to the network.

5. The computer-implemented method of claim 4, further comprising:
   determining, from the first data, that a cause of the failure of the previously established connection is associated with a change in credentials associated with the network from a first credential to a second credential, wherein transmitting the second data comprises transmitting the second credential.

6. The computer-implemented method of claim 4, further comprising:
   determining, from the first data, a length of time in which the first device has been disconnected from the network, wherein determining that the first device is authorized to reconnect to the network is further based at least in part on the length of time.

7. The computer-implemented method of claim 4, further comprising:
   determining, from the first data, an identification of one or more networks within a communication range of the first device, wherein determining that the first device is authorized to reconnect to the network is based at least in part on the identification of the one or more networks within the communication range of the first device.

8. The computer-implemented method of claim 4, further comprising:
   determining that the first device is registered under a user account, wherein the user account is associated with the network;
   determining a third device registered under the user account; and
   determining connectivity status of the third device, wherein determining that the first device is authorized to reconnect to the network is based at least in part on the connectivity status of the third device.

9. The computer-implemented method of claim 4, further comprising:
identifying a third device within a communication range of the first device; and
generating an instruction to reestablish a connection with the network using the third device as a proxy device, wherein transmitting the second data comprises transmitting the instruction.

10. The computer-implemented method of claim 4, further comprising:
identifying, from the first data and from a user account associated with the network, one or more factors for determining a confidence that the first device is authorized to access the network, wherein determining that the first device is authorized to reconnect to the network is further based on the confidence that the first device is authorized to access the network exceeding a threshold.

11. The computer-implemented method of claim 4, further comprising:
determining that the first device is associated with a known software or hardware bug, wherein determining that the first device is authorized to reconnect to the network is based at least in part on the first device being associated with the known software or hardware bug.

12. The computer-implemented method of claim 4, further comprising:
generating a first set of instructions instructing the second device to transmit a credential stored by the second device to the first device, wherein transmitting the second data comprises transmitting the first set of instructions.

13. The computer-implemented method of claim 4, wherein the first device is associated with a user account, and further comprising:
receiving a first list of networks that are within a communication range of the first device;
comparing the first list of networks to a second list of networks, the second list of networks being stored in association with the user account; and
determining a match between the first list of networks and the second list of networks, wherein determining that the first device is validated is further based on the first list of networks matching the second list of networks.

14. The computer-implemented method of claim 4, further comprising:
receiving third data from one or more devices within a same geographic area as the first device;
determining, from the first data and the third data, a service failure of data connections in the geographic area; and
delaying, in response to determining the service failure of data connections in the same geographic area, transmitting the second data for a predetermined time interval.

15. A system comprising:
one or more processors;
one or more non-transitory computer-readable media storing instructions that, upon execution by the one or more processors, cause the system to:
store an association between a first device and a network, the network comprising an access point and a second device connected with the access point, the association indicating that the first device is authorized to be on the network;
receive, from the second device, first data of the first device, the first data providing an indication of a failure of a previously established connection between the first device and the network;
determine, based at least in part on the association and the first data, that the first device is authorized to reconnect to the network; and
transmit, to the first device and via the second device, second data associated with reconnecting the first device to the network.

16. The system of claim 15, wherein the one or more non-transitory computer-readable media further store additional instructions that, upon execution by the one or more processors, cause the system to:
identify, from the first data, an indication that the first device is authorized to reconnect to the network; and
compare the indication that the first device is authorized to reconnect to the network to data stored in association with the first device, wherein determine that the first device is validated is further based at least in part on an outcome of the compare.

17. The system of claim 15, wherein the one or more non-transitory computer-readable media further store additional instructions that, upon execution by the one or more processors, cause the system to:
determine, from the first data, a cause of the failure of the previously established connection; and
generate an instruction to switch from a first frequency band to a second frequency band based on the cause of the failure of the previously established connection, wherein the second data comprises the instruction.

18. The system of claim 15, wherein the one or more non-transitory computer-readable media further store additional instructions that, upon execution by the one or more processors, cause the system to:
determine, from the first data, that a cause of the failure of the previously established connection corresponds to a change in a network identifier of the network from a first network identifier to a second network identifier; and
generate an instruction to reestablish a connection with the network using the second network identifier, wherein the second data comprises the instruction.

19. The system of claim 15, wherein the one or more non-transitory computer-readable media further store additional instructions that, upon execution by the one or more processors, cause the system to:
determine, based at least in part on the first data, a type of the first device;
determine, based at least in part on the type, that a user confirmation to reconnect the first device to the network is required;
transmit, to a user device, a request to receive the user confirmation; and
receive, from the user device and based at least in part on user input at the user device in response to a presentation of the request, the user confirmation, wherein the user device and the first device are associated with a same user account, and wherein the first device is determined to be authorized to reconnect to the network is further based at least in part on the user input.

20. The system of claim 15, wherein the one or more non-transitory computer-readable media further store additional instructions that, upon execution by the one or more processors, cause the system to:
store, within a user account, two or more credentials each credential corresponding to a different access point;

determine, from the first data, credential from the two or more credentials; and include, within the second data, the credential corresponding to the access point.

\* \* \* \* \*